May 21, 1929.   H. G. TRAVER   1,713,793
AMUSEMENT RIDE
Filed March 19, 1925   8 Sheets-Sheet 1
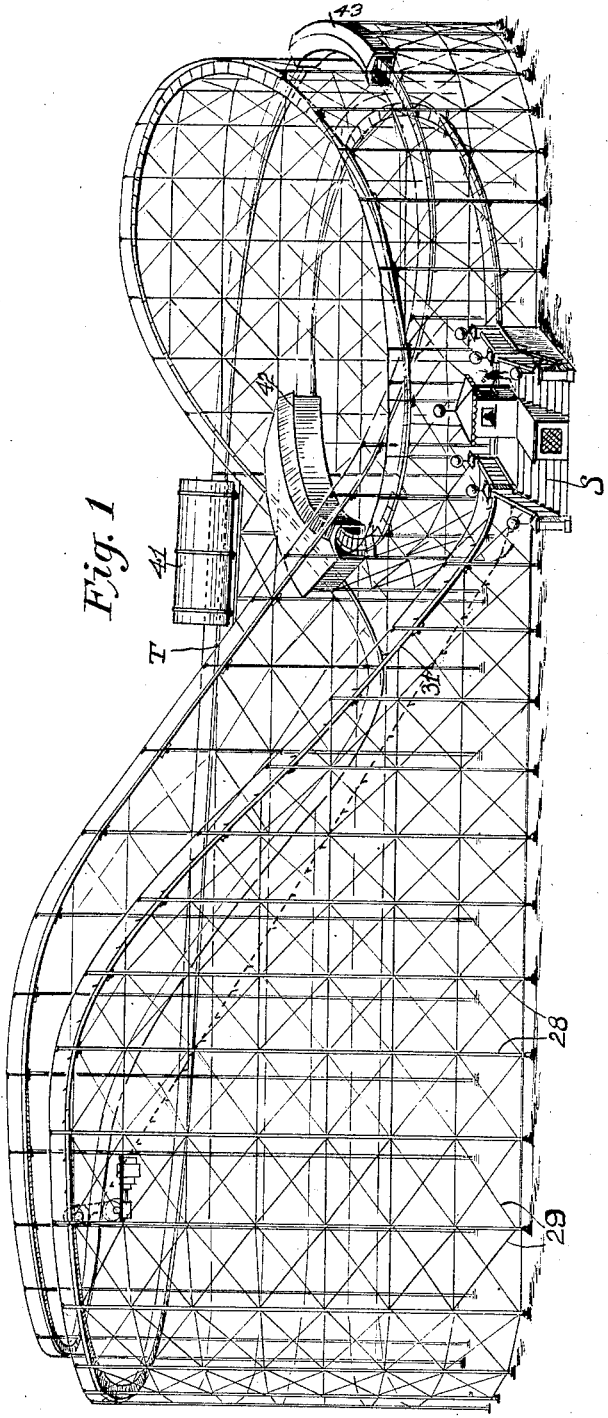
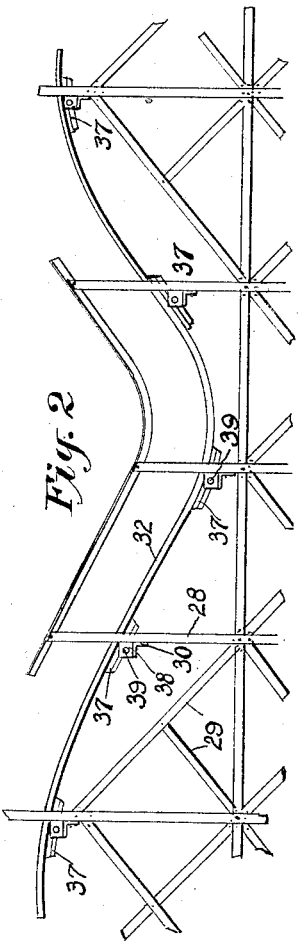
Inventor
H. G. Traver
By his Attorney John O. Seifert

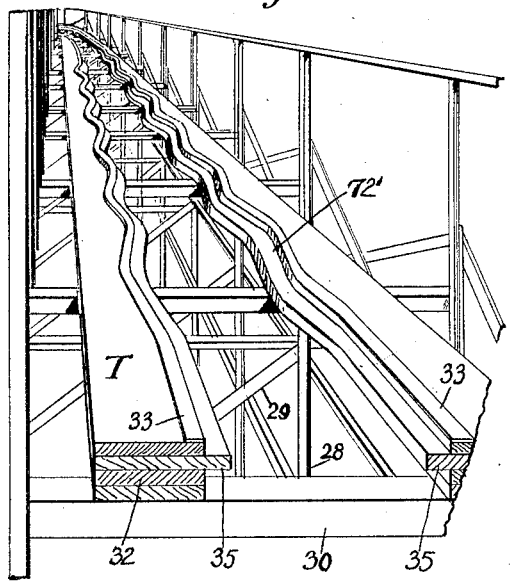
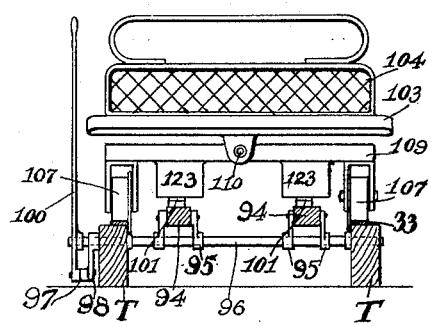
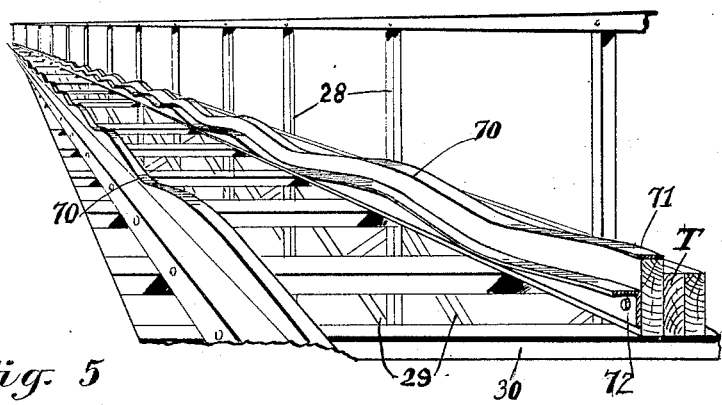
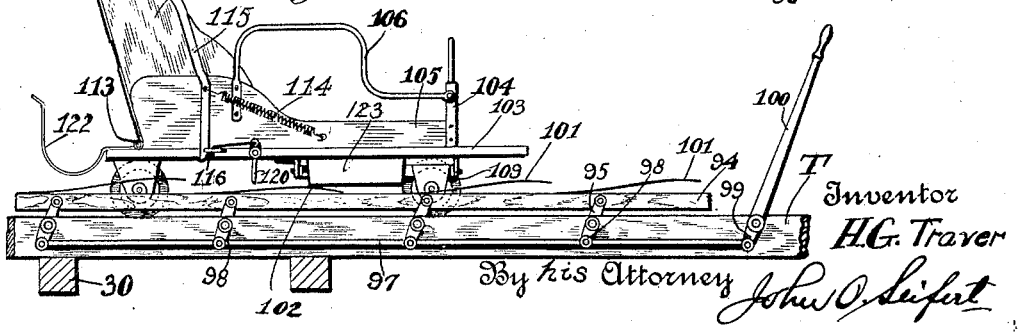

May 21, 1929.  H. G. TRAVER  1,713,793
AMUSEMENT RIDE
Filed March 19, 1925  8 Sheets-Sheet 3

Inventor
H. G. Traver
By his Attorney
John O. Seifert

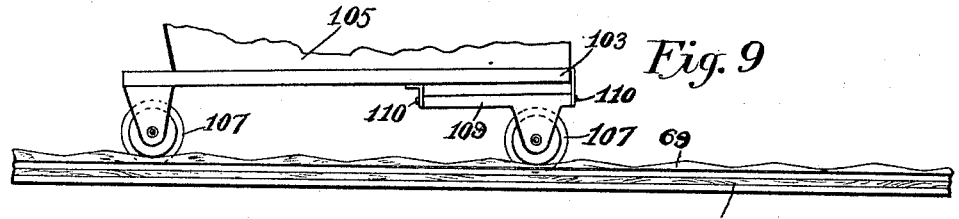
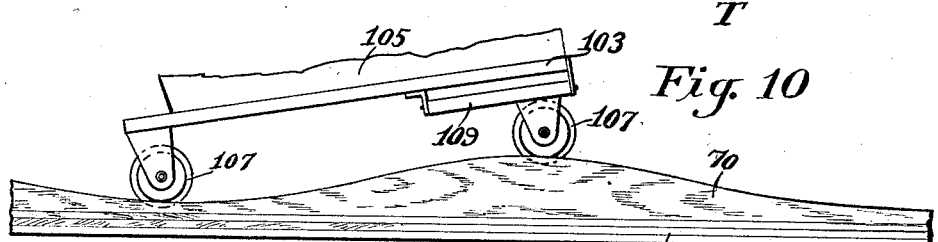
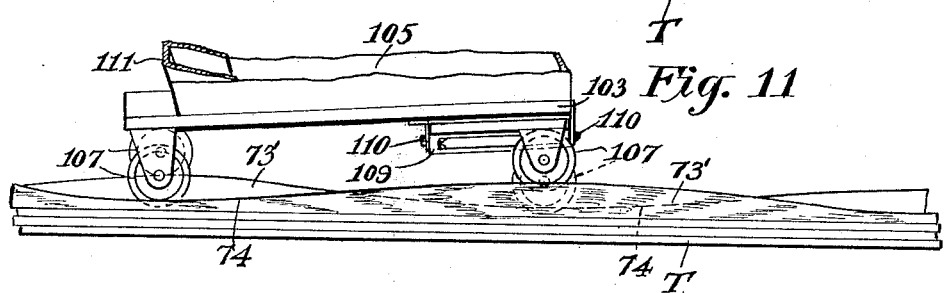
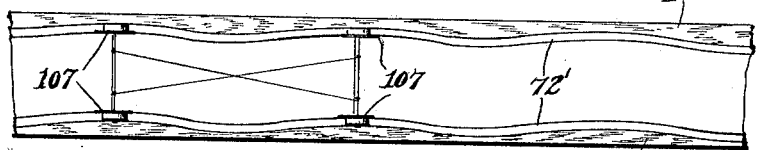
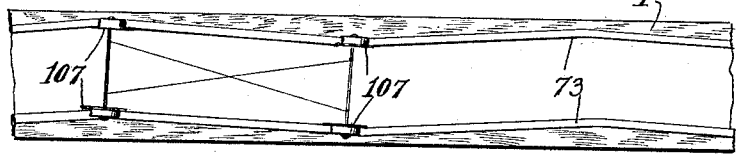
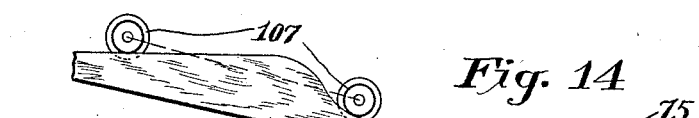
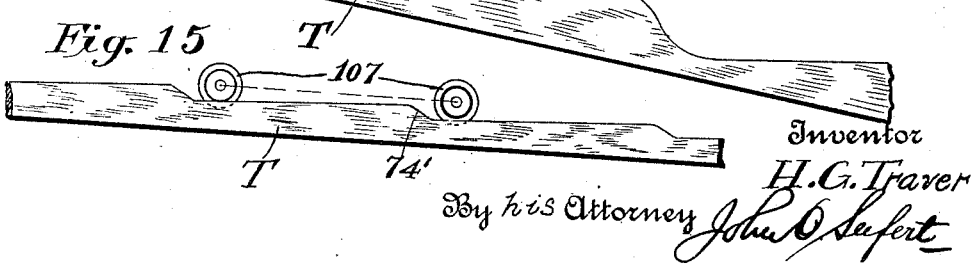

May 21, 1929.  H. G. TRAVER  1,713,793
AMUSEMENT RIDE
Filed March 19, 1925   8 Sheets-Sheet 5

Inventor
H. G. Traver.
By his Attorney John O. Seifert

May 21, 1929.   H. G. TRAVER   1,713,793
AMUSEMENT RIDE
Filed March 19, 1925    8 Sheets-Sheet 6

Inventor
H. G. Traver
By his Attorney John O. Seifert

May 21, 1929. H. G. TRAVER 1,713,793
AMUSEMENT RIDE
Filed March 19, 1925 8 Sheets-Sheet 7
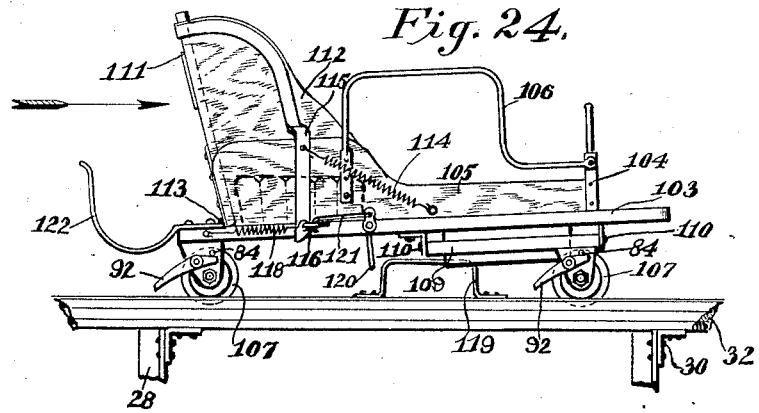
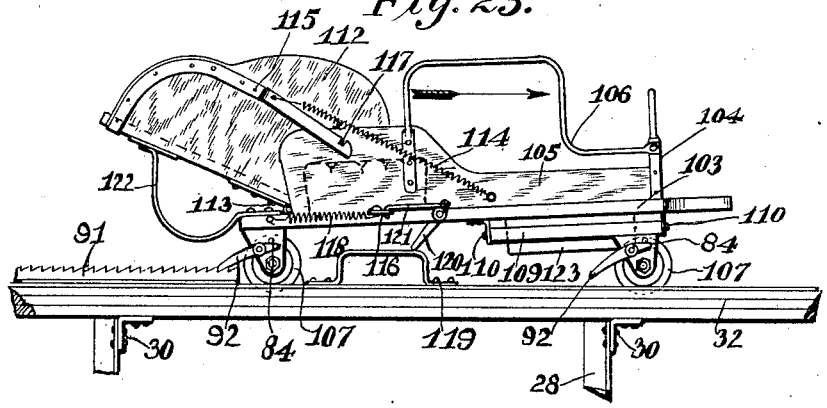
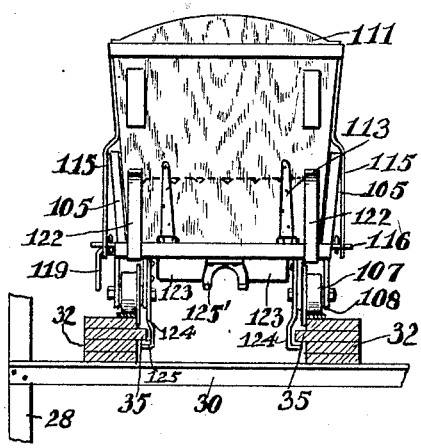
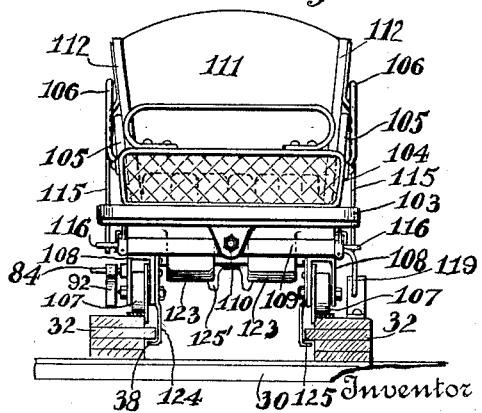
Inventor
H. G. Traver
By his Attorney
John C. Seifert May 21, 1929.  H. G. TRAVER  1,713,793
AMUSEMENT RIDE
Filed March 19, 1925   8 Sheets-Sheet 8
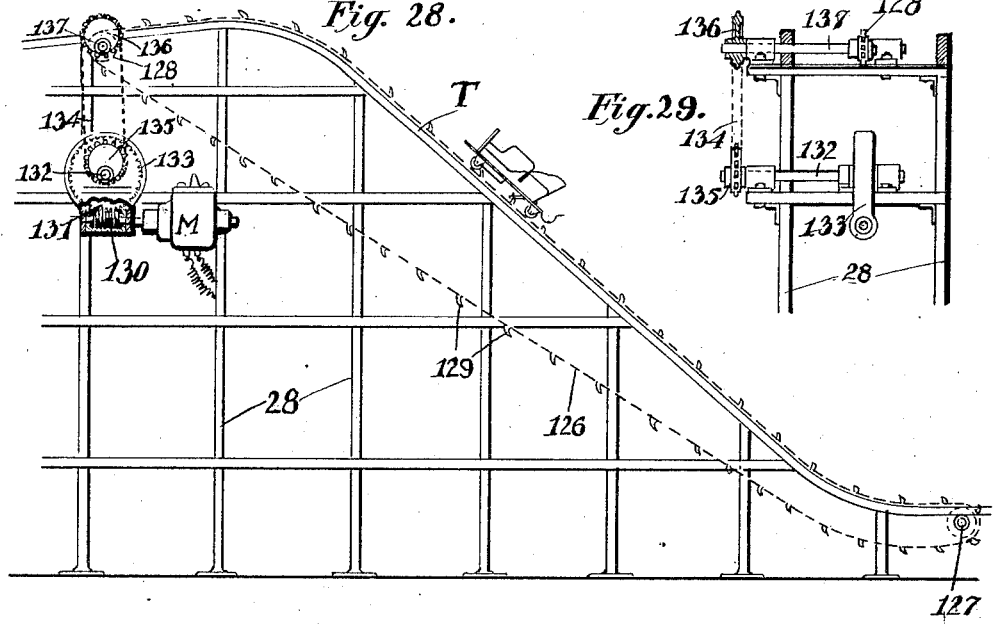
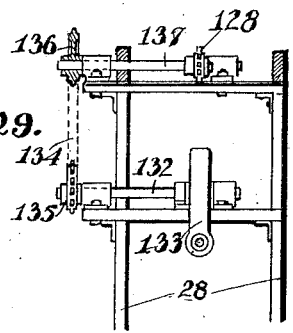
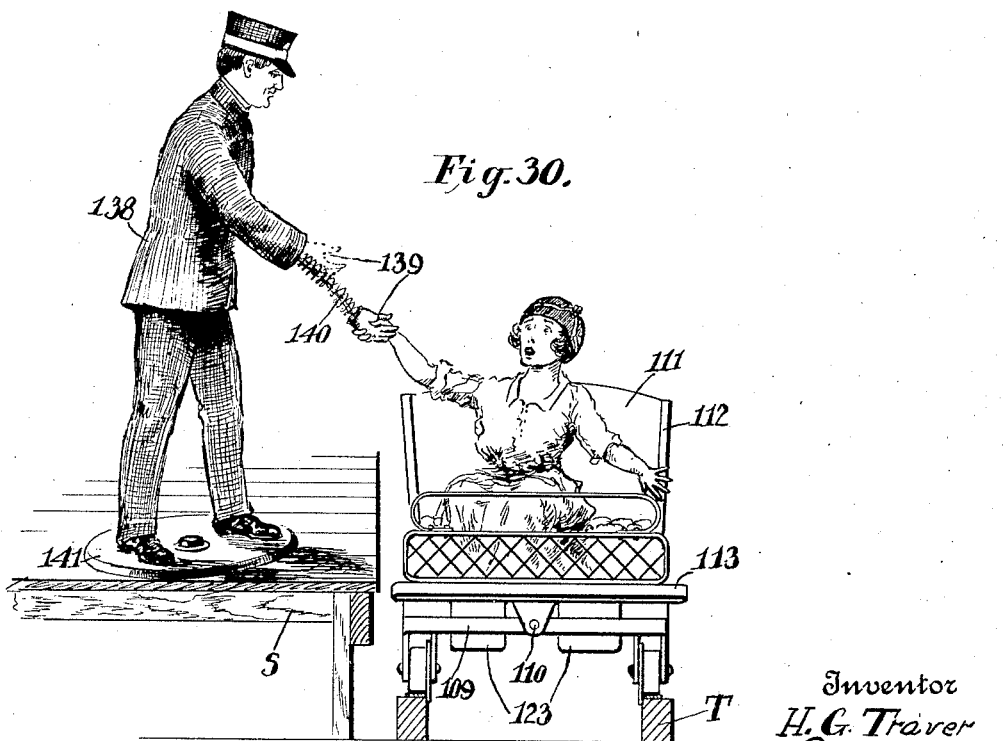
Inventor
H. G. Traver
By his Attorney Patented May 21, 1929.

1,713,793

UNITED STATES PATENT OFFICE.

HARRY G. TRAVER, OF BEAVER FALLS, PENNSYLVANIA.

AMUSEMENT RIDE.

Application filed March 19, 1925. Serial No. 16,831.

This invention relates to amusement rides embodying a track structure arranged with dips, rises and curves and along which track passenger carrying cars move by gravity after they have been moved to an elevated position of the track structure.

In apparatus of this character speed and novelty are necessary in order to make the ride attractive and draw patrons, and it is the object of the present invention to provide an improved amusement ride wherein passengers of a car are subjected to successive thrills and mirth provoking novelties for the entire duration of the ride, and to provide apparatus of this character which is compact in structure and safe.

It is a further object of the invention to provide in apparatus of this character means to effect illusory representations to passengers, as giving an illusion of the car passing through episodes in action, such as a forest fire, a rain storm, a snow storm and of a car revolving about the track as it moves along the same.

It is a further object of the invention to provide an improved passenger carrying car for amusement rides, wherein the seat is provided with a backward tilting back support, which seat back is normally releasably retained in back supporting position and adapted to be released as the car moves along the track to cause the passenger to assume a partly inclining position, and after the seat has been tilted cause it to immediately be returned to back supporting position.

Further objects of the invention relate to noise making means to be actuated by the car as it passes along the track, such as the ringing of bells and the making of a clattering noise as the car rides down dips in the track, and also to means to impart an electric shock to a passenger of a car as well as when the passenger leaves the ride.

Another object of the invention relates to the provision of a blower which is set in operation and stopped by the movement of the car along the track, and the blower arranged to direct the blast of air therefrom laden with comminuted material, such as confetti, against the passengers in the cars as they move along the track, a collector being provided for said material from which it is drawn by the blower to be used repeatedly.

In the drawings accompanying and forming a part of this specification, Figure 1 is a perspective view of a track structure of an amusement device illustrating an embodiment of my invention.

Figure 2 is an enlarged side elevation of a portion of the track structure to show the mounting means for the track.

Figure 3 is a perspective view of a section of the track and showing the same arranged with lateral undulations to impart a sinuous lateral movement to a car as it passes along said section of the track.

Figure 4 is a perspective view of a section of the track structure showing the same arranged with up and down undulations to impart a sinuous up and down movement to a car passing over said section of the track.

Figure 5 is a side elevation of my improved means for stopping the cars and showing a car in relation thereto.

Figure 6 is an end elevation of the car stopping means looking at the right of Figure 5.

Figures 9, 10 and 11 are side elevations of sections of the track to show the arrangement of the undulations in different sections of the track and showing the position of a car in relation thereto.

Figures 12 and 13 are plan views of the track sections shown in Figures 9 and 10 respectively.

Figures 14 and 15 are side elevations of track sections showing a stepped arrangement of the track and in a diagrammatic manner showing the position the car wheels and car will assume when passing along said track sections.

Figure 24 is a side elevation of my improved car for use in connection with the ride and showing the same in relation to a section of the track arranged with an abutment for engagement of means to release the pivoted seat back of the car and permit of backward tilting movement of said back.

Figure 25 is a view similar to Figure 23 to show the releasing means for the seat back as released and said back tilted backward, and also showing the car as arranged with pawls to engage with ratchet bars to prevent backward movement of the car on the track.

Figure 26 is an end elevation looking in the direction of the arrow in Figure 24.

Figure 27 is a front elevation looking at the car in a direction reverse to that indicated by the arrow in Figure 24.

Figure 28 is an elevational view of that portion of the track supporting structure arranged with the take up or elevating means for the cars and showing an embodiment of improved car elevating or take up means.

Figure 29 is a side elevation of the driving means for the track by means looking at the left of Figure 28, and showing the same partly in section; and Figure 30 is a sectional view of the loading station and showing a further novelty embodied in the ride.

Similar characters of reference designate like parts throughout the different views of the drawings.

In carrying out the invention there is provided a track structure substantially as shown in Figure 1 comprising uprights 28 maintained in upright position by interconnected braces and tie-rods 29, the track (designated in a general way at T), being mounted upon transversely extending ledger plates 30 suitably fixed to the uprights. The track structure is a continuous one, is arranged with dips and rises and with curved portions to provide a track of considerable length to take up a minimum of ground area. The track structure is arranged with a car loading and passenger discharging station S including a platform arranged at a low portion of the structure. The cars are elevated from the loading station up an incline portion 31 of the track to a high point of the structure by the usual chain elevating means (not shown) operated from a suitable source of power and from which high portion of the structure the cars move along the track and return to the loading station by gravity.

Figure 17:
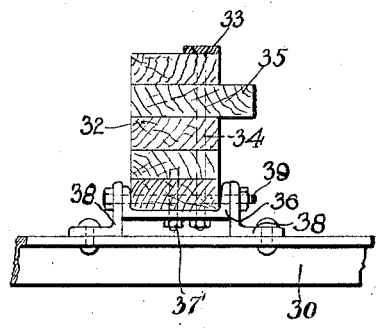
Figure 17 is a cross sectional view taken substantially on the line 17—17 of Figure 16 looking in the direction of the arrow.
Figure 21:
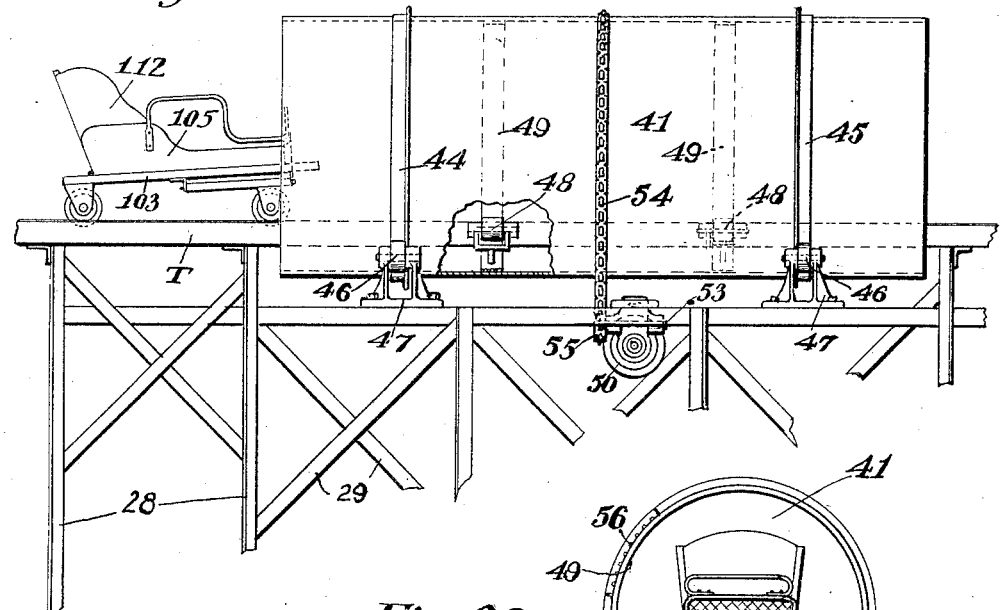
Figure 21 is a side elevation of a section of the track arranged with a revoluble enclosure or tunnel in relation thereto and means for revolving said enclosure.
Figure 22:
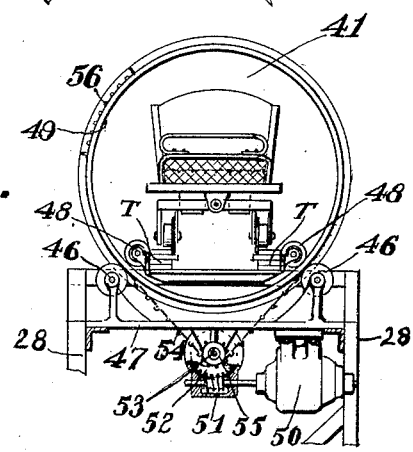
Figure 22 is an end elevation looking at the right of Figure 21 and partly broken away to show the connection of an electric motor with the driving means for the enclosure.

The track is constructed of laminations, preferably wood, as shown at 32, and a metallic strip or rail 33 juxtaposed to the upper lamination of the wood, the whole being bound together by bolts 34. One of the track laminations, preferably the one next to the top, is made of greater width than the other laminations so that it will project laterally therefrom, as shown at 35 in Figure 17, below which engages a safety device, hereinafter described, connected to the cars to prevent the cars from jumping the tracks. To facilitate the mounting of the track rails at the dips, rises and curves the tracks are mounted in saddles 36 of channel shape in cross section with short lengths of flexible members 37, such as boards, secured to the saddles by bolts 37′ and interposed between the saddles and track, and also connected to the track by the track bolts 34. The saddles are pivotally supported upon angle brackets 38 fixed upon the ledger plates 30 by bolts 39. The saddles in longitudinal section may be flat or of convex form, and by bolting the flexible members 37 thereto they are adapted to assume the shape of the saddles and when bolted to the track serve to firmly hold the track to its curved form. This adaptation of the saddle supports for the track is further facilitated due to the adjustability of the saddles about their pivot supports 39, as clearly shown in Figure 2. As stated, one of the objects of the invention, and which constitutes the principal object of the invention, is the provision of means for imparting novelty to the ride. For this purpose the structure is substantially of rectangular shape in plan with the station S located at the juncture of one side and end of the structure from which the up-track portion 31 leads at one side of the structure. From the uppermost part of the up-track portion the track leads in a declivous course in a curved portion about the end, along the side opposite the up-track portion 31 and to a curved portion at the opposite end of the structure to a second up-track portion arranged within and at a higher plane than the first up-track portion, and up which second up-track portion a car or cars travels through the speed acquired coming down the declivous track portion. From the top of said second up-track portion the track leads to a second declivous track portion from which it leads to a third up-track portion leading to a declivous track portion arranged in the form of a spiral the convolutions of which are evolved about a vertical axis and then leads to the station S. The track structure is arranged with enclosures or tunnels, shown in the present instance as three in number 41, 42 and 43. The tunnels 42 and 43 are fixed upon the supporting structure, preferably at a curved section of the track for a purpose to be hereinafter described. The tunnel 41 (Figures 21 and 22) is supported to have revolving movement about the track thereby giving an illusory effect to the passengers of cars as they approach and pass through said tunnel as revolving about the track with the car. This tunnel is revolubly supported by annular tracks 44, 45 of angle shape in cross section extending around the tunnel, said tracks engaging upon rollers 46 arranged at opposite sides and in a plane below the car supporting tracks, said rollers being rotatably carried in brackets 47. The angle portion or flange of the brackets 44, 45 engage at the inner ends of the rollers thereby holding the tunnel against longitudinal movement. To maintain the tunnel in operative relation to the supporting rollers 46, rollers 48 supported at opposite sides of the track within the tunnel engage with annular tracks 49 on the interior of the tunnel. The tunnel is rotated from a suitable source of power, that in the present instance comprising an electric motor 50 mounted upon the track structure, the power shaft of said motor having a worm 51 fixed thereto meshing with a worm wheel 52 fixed to a shaft 53 rotatably carried by the track 47 and from which shaft the tunnel is driven by a sprocket chain 54 passing around a sprocket wheel 55 fixed to the shaft 53 and sprocket teeth 56 disposed about the tunnel.

Figure 8:
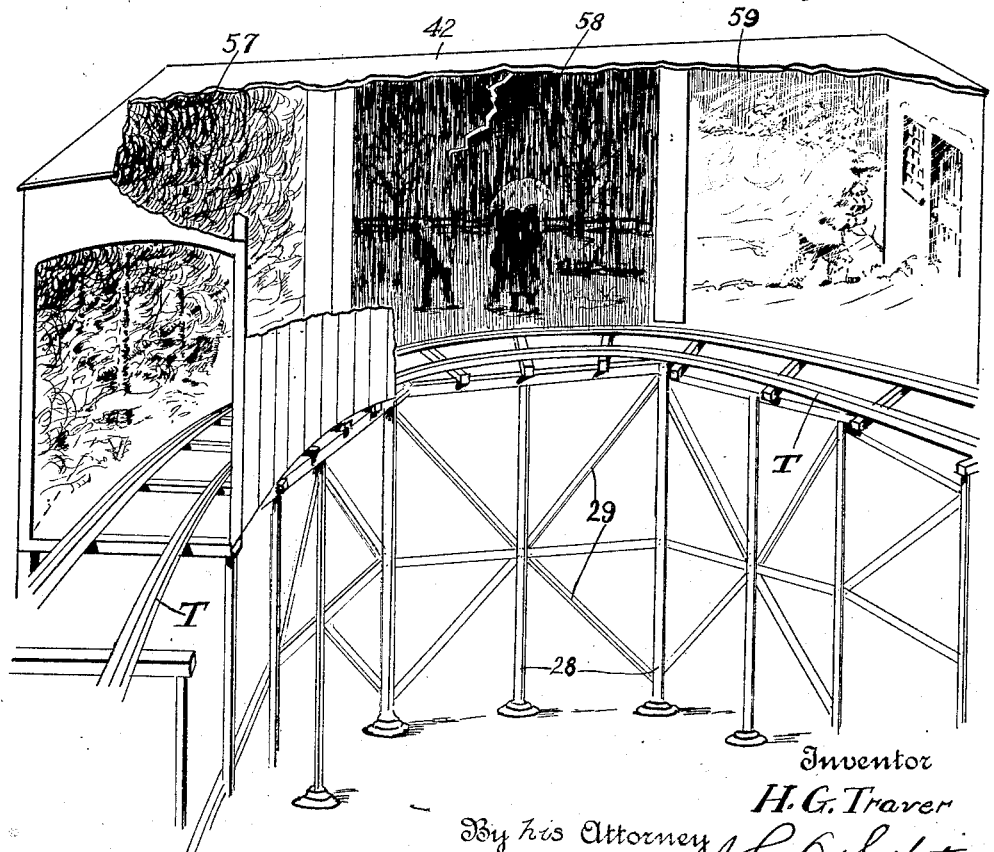
Figure 8 is a perspective view of a curved section of the track arranged with an enclosure or tunnel, the enclosure being partly broken away to show the same arranged with scenic effects within the closure to give passengers of cars passing through said enclosure the illusory effect of passing through the episodes depicted by the scenes.
Figure 16:
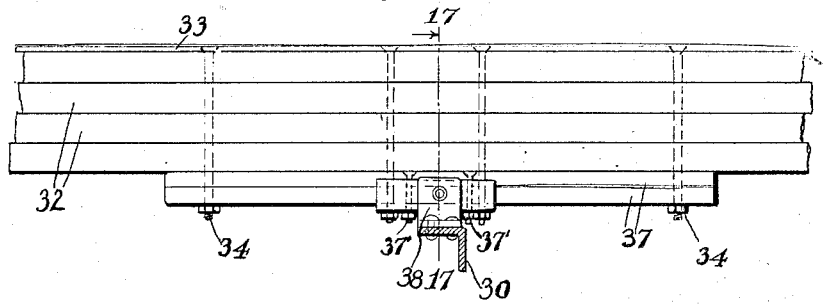
Figure 16 is a side elevation of a portion of the track to show the mounting thereof on the ledger plates of the track supporting structure.

The enclosures or tunnels 42 and 43 are preferably arranged at curved sections of the track and the interior of one or both of the enclosures are arranged with illuminated scenic effects of episodes in action and giving to the passenger of a car passing therethrough the illusory representation of passing through the episode depicted. These illusory representations in the present instance are representative of a forest fire, a rain storm and a snow storm, as shown at 57, 58 and 59 in Figure 8 and arranged in the tunnel 42. By arranging the tunnel at a curve of the track as the car passes around the curve it will give the illusion to a passenger in the car of entering into and passing through the episode depicted. While the depiction of the episodes are shown as arranged in a single tunnel it will be obvious that each episode may be arranged in a separate tunnel.

Figure 7:
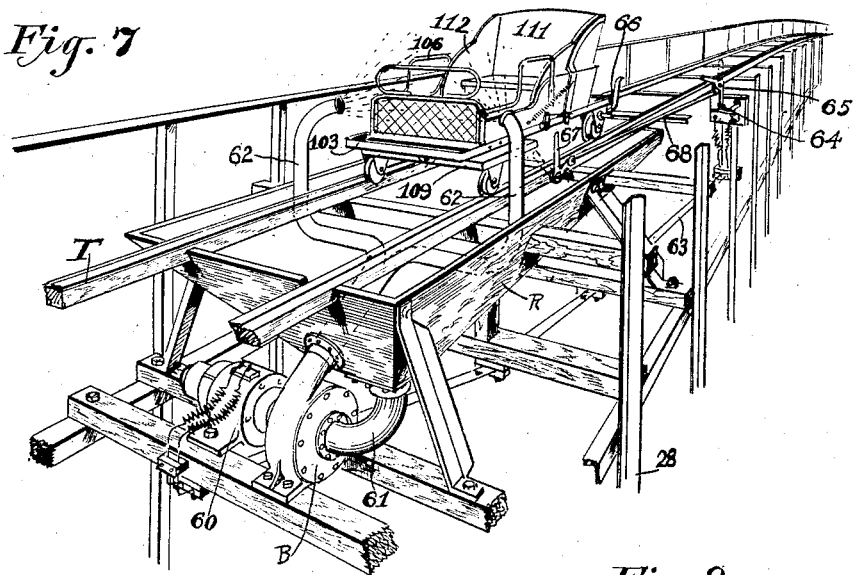
Figure 7 is a perspective view of a section of the track arranged with a container for comminuted material with blower means associated therewith arranged to direct the blast from the blower in a direction toward a car passing along said section of the track, a car being shown in relation to said means.

To further augment the novelty of the ride there is arranged along the track means to direct a blast of air, either laden with a comminuted material, such as confetti, or without, against the passengers as the cars pass. For this purpose there is arranged a pan like confetti containing receptacle R below a section of the track and to extend laterally thereof and having the bottom sloping from one end to the opposite end to cause the confetti to collect at one end of the receptacle (Figure 7). A blower B driven by an electric motor 60 has the inlet 61 thereof connected to the bottom of the receptacle of greatest depth, the outlet of the blower having two branches 62 leading therefrom to opposite sides of the track with the outlets of said branches directed transversely of the track and in a direction toward an oncoming car, as clearly shown in Figure 7. By the arrangement of the receptacle it will serve as a collector for the confetti so that the same may be used repeatedly. The blower is operative only during the period of time that the car is passing along the section of the track at which the receptacle R is located, and for this purpose means are provided to start and stop the driving motor 60 for the fan operative by the car as it passes along the track. For this purpose there is connected in the motor circuit 63 a normally open switch, as indicated in a general way at 64, having an actuator 65 pivotally mounted at the side of a rail of the track and having a part normally projecting up into the path of an abutment 66 extending laterally from the wheel truck of a car to engage with said switch projection and move the switch to circuit closing position. This circuit closing movement of the switch will cause one arm of a bell crank lever 67 also pivotally mounted at the side of the rail in advance of the switch actuator 65 to be moved into the path of the car abutment 66 as said abutment engages with and moves the switch actuator 65 to switch closing position through a link connection 68 between said actuator 65 and the other arm and the lever 67. As said lever 67 is moved to the dotted line position, as shown in Figure 7, by the engagement thereof by the car abutment 66, the switch actuator 65 is moved to circuit opening position and in position to be engaged and actuated by the next car passing along the track.

To impart a further thrill to the passengers of cars the track is arranged with undulated sections with the undulations arranged in an upward and downward direction and in a lateral direction and thereby giving the effect of a car riding over obstructions and bumps, and to also impart a side swaying movement to the car. In Figures 3, 4 and 9 to 13, inclusive, there is shown different track sections arranged with variably formed undulations. As shown in Figure 9 the track is arranged with abrupt up and down undulations 69 forming ripples and as the car rides over the same slight jounces in an upward direction will be imparted to the car. In another section of the track these up and down undulations are prolonged or extended as shown at 70 in Figures 10 and 4 with the distance between the centers of the rises and dips of the undulations equal to the distance between the centers of the forward and rear wheels of the cars and imparting an up and down swaying movement to the car by raising one portion of the car, as the front, shown in Figure 10, and lowering the rear portion. In the sections of the car arranged with up and down undulations instead of arranging the laminations of the track in superposed relation they may be arranged in sidewise relation, as shown in Figure 4, with the innermost lamination of greater width than the other laminations and projecting above the same and has a metallic plate secured to the top, as shown at 71. To provide a means for engagement of a device on the car to prevent the same from jumping the track an angle bar is secured to the inner side of the track member 71 with the one angle portion having the same undulated form as the track portion 71.

To effect a sinuous lateral or sidewise movement of the car sections of the track are arranged with lateral undulations as shown in Figures 3, 12, and 13. The undulations 72 of the one track section (Figures 3 and 12) are abrupt, having the distance between the centers of the curves equal to about one-half of the distance between the axles of the cars to impart a movement to the car as though the car, as a whole, was moving to the right or left according to the direction of the curves in the track, while the undulations of the other section 73 are prolonged or extended, having the distance between the centers of the curves equal to the distance between the axles of the car so that as one end is moved to the right the other end is moved to the left, or vice versa, according to the direction of the curves. Another section of the track, as shown in Figure 11, is arranged with the up and down undulations as shown in Figure 10, but with the rise or high portion 73 of one track arranged opposite to the dips or depressions 74 of the opposite rail, and as the car passes over said section of the track imparting an oscillating movement to the car on an axis extending longitudinally of the car, which is due to the particular construction and arrangement of the car to be hereinafter described.

Other sections of the track are arranged as shown in Figures 14 and 15 to permit of successive stepping down or jumping of a car as it passes over the same, as shown at 74'. These depressions in one section are slight, while in another section the steps are quite precipitous, as shown at 75 in Figure 14. In Figures 9 to 15 inclusive I have shown in a diagrammatic manner the various positions a car will assume as it passes over the undulated sections of the track.

Figure 18:
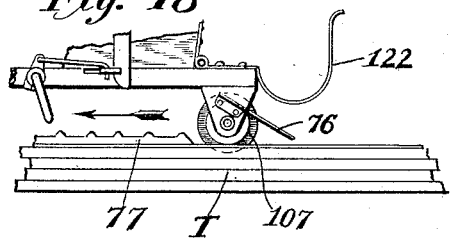
Figure 18 is a side elevation of portions of the track and a car showing the track arranged with a ratchet member and the car with a resilient pawl to engage said ratchet member as the car passes along said section of the track to make a clattering noise.
Figure 19:
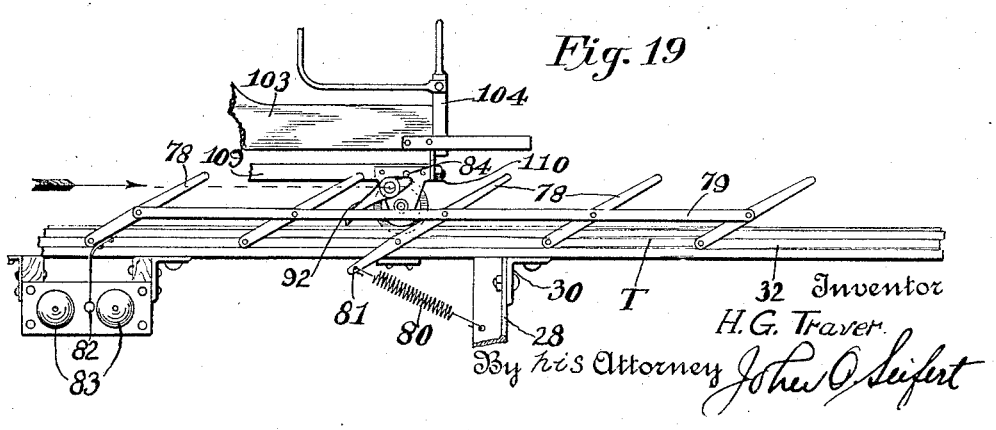
Figure 19 is a side elevation of portions of the track and a car, the track being arranged with bell ringing means and showing the manner of actuating said means as the car passes along said section of the track.

To lend further novelty to the ride noise making means are provided at certain portions of the ride, for instance, as the car is riding down a dip or incline a clattering noise in imitation of a clapper is effected by a resilient pawl 76 carried by the car riding over projections of a bar 77 fixed upon a declivous portion of the track, as shown in Figure 18. A noise is also effected by the ringing of bells, which means may be located adjacent the end of the ride, and as the car approaches the point of discharge of the passengers from the car, the bell ringing may also be a signal to an attendant that a car is approaching the terminus of the ride and notice to the attendant to actuate means to bring the car to a stop. This bell ringing means (Figure 19) comprises a series of levers 78 pivoted on the side of the track to extend upward and interconnected by a rod 79 having a pivotal connection with each lever. The levers are urged to upright position by a spring 80 secured at one end to the supporting structure and at the opposite end connected to the extended end of one of the levers, as at 81. One of the levers is provided with a resilient bell striker 82 engaging between and adapted to strike against a pair of bells 83. The bell striker is moved in one direction by an abutment 84 extending laterally from the truck of the forward wheels of the car to successively engage the levers 78 as the car passes along that section of the track at which the levers are arranged, depressing the extended ends of the levers against the tension of the spring 80 and as the abutment rides off from said levers the spring moving the levers in opposite direction.

Figure 23:
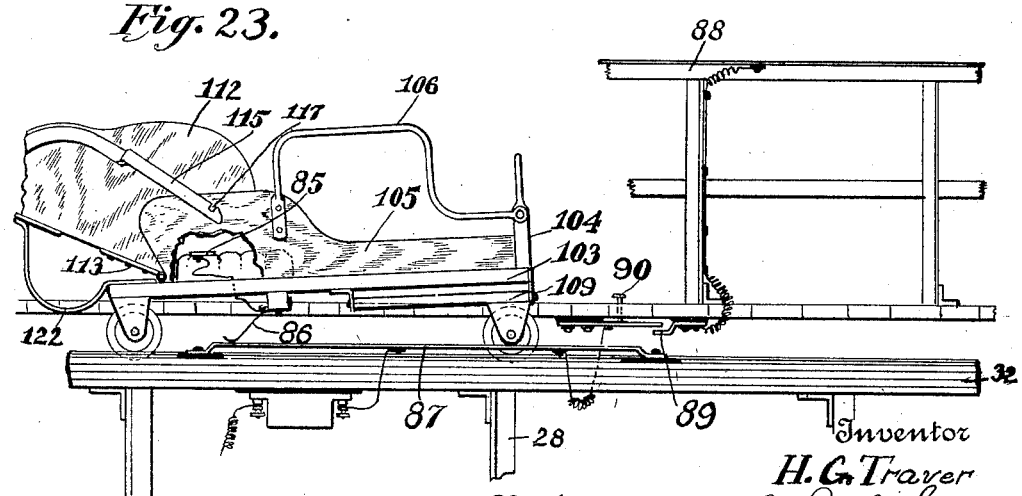
Figure 23 is a side elevation of the section of the track arranged adjacent the loading station of the ride showing electric shocking means arranged in a car and relative to a railing of a platform of the station adapted to be connected in an electric circuit by a passenger in the car or on the platform.

To present another mirth provoking novelty means are provided to electrically shock a passenger at some point during the ride and also as the passenger is leaving the loading and discharging station. One of these means comprises a current conducting member arranged upon the seat of the car, as shown at 85 in Figure 23, connected to contact terminals 87 arranged at opposite sides of the car, said contact terminals 87 of the electric circuit being arranged upon the track with which the contact makers 86 are adapted to make contact and close the circuit through said contact makers and connect the shocking device 85 therein. Another electric shocking device comprises an electric current conducting member 88 on a railing arranged about the platform of the loading station, which member 88 is connected in an electric circuit having a normally open switch 89 interposed therein, which circuit may be closed by one walking under the platform and giving a shock to one grasping the rail 88. The switch 89 is preferably arranged with an actuator 90 to be operated by an attendant when desired.

As stated, the ride is of that type wherein the cars are taken up or elevated to a high portion of the track structure and from which point they operate by gravity, and should the cars not have gained sufficient momentum to carry them over the rises in the track structure means are provided to prevent the cars from moving backward down the rises. For this purpose ratchet bars 91 (Figure 25) are fixed upon the track rails over which pawls 92 pivotally carried by the cars ride in the forward movement of the cars, the pawls engaging with the teeth of the ratchet bars by gravity and holding the car against backward movement should a car come to a stop. The movement of the pawls in one direction are limited by the abutment 84 which engages with the bell ringing means. This pawl and ratchet mechanism may also serve as a noise maker.

To bring the cars to a stop at the completion of the ride and as they enter the loading and unloading station friction braking means is provided. This means as shown in Figures 5 and 6 comprises a pair of rails 94 extending parallel of and within the rails of the track, said rails 94 being pivotally supported to have movement in an up and down direction. For this purpose each rail 94 is secured between a series of pairs of arms 95, one pair of said arms for each rail being fixed to shafts 96, as shown in Figure 5, said shafts being rotatably mounted in the track rails at opposite ends. The shafts are interconnected to be operated in unison by a rod 97 pivotally connected to an arm 98 fixed to each of the shafts 96 and the one end of said rod connected at 99 with a pivoted hand lever 100. As the lever is moved in one direction the rails 94 will be moved upward to extend in a plane above the track rails causing resilient members, in the form of leaf springs 101 fixed at one end upon the rails with the opposite ends free and tensioned to normally assume a position in spaced relation to the rails, as clearly shown in Figure 5, to engage with shoes at the bottom of the car, as shown at 102, and thereby frictionally retarding the movement of the car.

The passenger carrying car comprises a body portion 103 arranged with a front 104, sides 105 and side hand rails 106. The car is arranged with flanged wheels 107 at the forward and rearward ends which flanges are arranged to engage at the inner sides of the track rails 32, as shown in Figures 26 and 27. The rear wheels are rotatably carried by a truck 108 fixed to the car body. The car body is supported upon the front wheels whereby said wheels and the car body may have rotative movement relative to each other on an axis extending longitudinally and preferably centrally of the car. For this purpose the forward wheels are rotatably carried at one end, to constitute the forward end, of a truck 109 of rectangular open frame structure and having a pivotal connection with the car body as at 110. The car is provided with a seat back 111 arranged with integral side wings 112, said seat back being pivotally supported upon the car body, as by hinges 113, to permit the seat back to have a limited backward tilting movement. The seat back is urged to its forward and back supporting position by springs 114 at opposite sides thereof, one end of the springs being connected to the car sides and the other end to arms 115 secured to the back wings and arranged to engage at the outer sides of the car sides 105. The seat back is releasably secured in back supporting position by pivoted latches 116 to engage a notch 117 in each arm, the latches being urged in a direction to engage the arm notches by springs 118, the latches being adapted to automatically engage in the arm notches by rounding or bevelling the ends of the arms 115, which ends as the seat back is moved to back suporting position engage a latch and move the same against the tension of the latch spring 118. The seat back is adapted to be automatically released and caused to be tilted backward by a passenger of the car at a predetermined point in the ride to thereby impart a further thrill to the passenger. For this purpose an abutment in the form of a U-shaped member 119 is fixed upon a rail 32 of the track and adapted to be engaged by a trigger 120 pivotally carried by the car and having a link connection 121 with the latch. The backward movement is limited and arrested by a yielding abutment in the form of abutted resilient members 122 of curved form secured at one end to the car body to extend laterally and upwardly, as clearly shown in Figures 24 and 25. As the seat back is released and is moved backward it will yieldingly engage with the free ends of said resilient arms which will be slightly stressed downward against their inherent tension, and as the abutments reach the terminus of this stressing movement the inherent tension or rebound of these springs to return to their initial position will assist the springs 114 to return the seat back to its normal position. The cars are relatively short and to provide leg room for passengers the forward end of the body is arranged with foot engaging pockets 123 which may also serve as shoes for the frictional engagement of the resilient members 101 (Figure 5) of the car stopping means. To hold the cars to and prevent the same from jumping the tracks arms 124 are fixed to the wheel trucks to extend downward to engage at the outer side of projecting portion 35 of the track rails 32 with the free ends of said arms arranged with an angle portion 125 to engage below the track projection 35 and normally out of engagement therewith. The cars are also arranged with a dog 125' (Figures 26 and 27) for engagement of take up or elevating means to move the cars up an inclined portion of the track.

Figure 20:
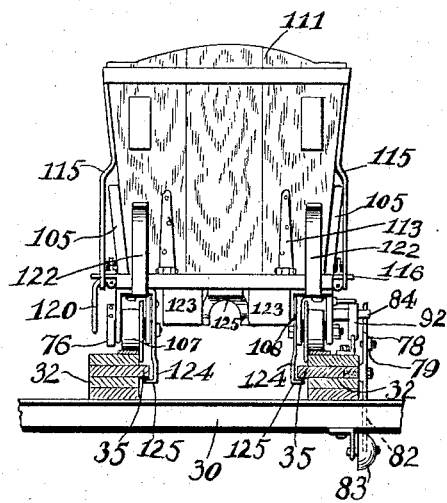
Figure 20 is a cross sectional view of the track looking in the direction of the arrow in Figure 19 to show the construction of the track, and showing the rear of the car on the track arranged with safety devices to co-operate with the track to prevent the car from jumping the track, and also showing the bell ringing means.

In amusement rides of this character the passenger carrying cars are elevated or moved up an inclined portion of the track to a high point of the structure and from which point the cars are operated by gravity. This elevating means comprises a sprocket chain 126 (Figure 28), which is in the nature of a traveling conveyer chain, said chain passing around a sprocket wheel 127 rotatably mounted adjacent the loading station from which wheel the upper stretch passes along a guideway arranged parallel with the track and over another sprocket wheel 128 at the top of the incline. The chain is provided with hooks or arms 129 to engage with the dogs 125' (Figures 20 and 26) arranged at the rear of the car when the car is positioned on the structure in advance of the sprocket wheel 127. These arms and dogs are so arranged that when the chain passes around the sprocket wheel 128 the arm 129 will be automatically released from the car dog 125'. The sprocket chain is driven from a suitable source of power, shown as comprising an electric motor M mounted upon the supporting structure having a worm 130 connected to or integral with the power shaft thereof, which worm meshes with a worm wheel 131 fixed to a shaft 132, the worm and worm wheel being enclosed in a suitable housing 133. The conveyer chain is driven from the shaft 132 by a sprocket chain 134 passing around a sprocket wheel 135 on said shaft and a sprocket wheel 136 fixed to the shaft 137 to which latter shaft the sprocket wheel 128 of the conveyer is fixed. To add further novelty to the ride the cars are elevated by intermittent and successive slow and fast movements. For this purpose the sprocket wheels 135 and 136 are fixed eccentrically to their respective shafts, as clearly shown in Figures 28 and 29. To add further novelty to the ride a dummy or lay figure 138 is arranged on the platforms of the loading and unloading station at the point of unloading (Figure 30), this figure being provided with a uniform to represent an attendant and so positioned with one arm extended to give the impression to a passenger of a car as it is brought to a stop at the unloading station, as one extending a helping hand to assist the passenger from the car to the platform. The hand 139 of the figure is carried out of one end of a coiled spring 140 which normally exerts a force upon the hand to move the hand to and retain it in the dotted line position. The hand is so positioned that in order that the hand may be grasped by a passenger it will be necessary to partly rise from the seat of the car and as a force is exerted upon the hand the spring will be extended with the result that the passenger will become unbalanced and again assume, somewhat violently, a sitting position in the car. The spring is preferably provided with a suitable covering to conceal the same when it is extended. The figure is mounted upon a rotatable support 141, and when it is not desired to have the figure to function in the manner hereinbefore stated the support is rotated to position the figure in a direction facing away from the track.

Having thus described my invention, I claim:

1. In an amusement ride, a track structure arranged with dips, risers and curves, and enclosures for portions of the track certain of which enclosures are arranged at the curves and fixed and another revoluble about and in a direction transversely of the track.

2. In an amusement ride, a track structure for gravity operated passenger carrying cars, and enclosures for portions of the track certain of which enclosures are fixed and arranged with scenic effects to give an illusory representation to a passenger of passing through the episode depicted as a car approaches the same and another of said enclosures being revoluble in a direction transversely to the track and giving the illusion of the car with the passenger revolving about the track while traveling along the same.

3. In an amusement ride in accordance with claim 2, the provision of means to direct an air blast from opposite sides of a portion of the track and against a car passing along said portion of the track.

4. In an amusement ride, in accordance with claim 2, the provision of a blower having outlet means at opposite sides of the track and directed inwardly to impinge the air blast in a direction toward the car passing between the blasts.

5. In coaster amusement railways, a track structure for gravity operated cars, a blower arranged at a predetermined position along the track having outlet means to direct the air blast from the blower from opposite sides of the track toward a car passing along said portion of the track, and means operative from the car to set the blower in operation and stop the same.

6. In coaster amusement railways, a track structure for gravity operated cars, a carrier for a comminuted material arranged at a predetermined point in the track structure, a blower having an inlet thereto connected to said container and having outlets arranged to direct the air blast from opposite sides of the track to draw the comminuted material from the container and deliver it against passages in cars passing said portion of the track, said container being arranged to collect the material delivered by the blower.

7. In an amusement ride, a track and a supporting structure therefor comprising uprights, track supporting ledger plates fixed to and extending transversely between said uprights, and rail supporting saddles pivotally supported by the ledger plates to have movement on an axis transverse of and to which the track rail is secured.

8. In an amusement ride, a track and a supporting structure therefor comprising uprights arranged with interconnected braces, track supporting ledger plates fixed to and extending transversely between the uprights, track rail supporting saddles mounted on said ledger plates to have movement on an axis transverse to the track rail, and a flexible member fixed to the saddles and to which member and the saddles the track rail is fixed.

9. In an amusement railway, the combination of a four wheel car, and a continuous track structure including a pair of rails along which the car is propelled having sections wherein the track rails are arranged with undulations the undulations of the rails of one section having a distance between the centers of the curves equal to one-half the distance between the axes of the forward and rear wheels of the car and the distance between the centers of the curves of the undulations of another section being equal to the distance between the centers of the forward and rear car wheels.

10. An amusement railway as claimed in claim 9, wherein the undulations of the track rails are arranged in an up and down direction, with the distances between the centers of the rises and dips of the undulations equal to the distance between the centers of the forward and rear car wheels.

11. An amusement railway as claimed in claim 9, wherein the track rails are arranged with successive undulations in an up and down direction with the undulations of one rail section having a distance between the centers of the curves equal to one-half the distance between the axes of the forward and rear car wheels, and the distance between the centers of the curves of the undulations of another rail section being equal to the distance between the centers of the forward and rear car wheels, and said rails arranged with successive laterally undulated sections the undulations of one of which sections having the distance between the centers of the curves equal to one-half the distance between the axes of the forward and rear wheels of the car, and the distance between the centers of the curves of the undulations of another section being equal to the distance between the centers of the forward and rear car wheels.

12. In an amusement railway, the combination of a four wheel car, and a continuous track structure including a pair of rails along which the car is propelled having sections both rails of which are arranged with corresponding lateral undulations, the undulations of one section having a distance between the centers of the curves equal to one-half the distance between the axes of the forward and rear car wheels, and the distance between the centers of the curves of the undulations of another section being equal to the distance between the centers of the forward and rear car wheels.

13. An amusement railway as claimed in claim 9, wherein the car is supported to have movement on the longitudinal axis thereof and the track is arranged with a section having up and down undulations, and having the rises of the undulations in one rail opposite to the depressions in the opposite rail, and the distance between the centers of the curves of each rail undulation being equal to the distance between the centers of the forward and rear wheels.

14. In an amusement ride, a car arranged with two pairs of traction wheels, one pair forward and the other rearward of the car, a continuous track structure including a pair of rails along which the cars are propelled having a declivous portion arranged with downwardly stepped sections with the successive steps spaced a distance apart less than the distance between the forward and rear car wheels, and the steps of one section being shallow while the steps of another section are precipitous.

15. In an amusement ride, a continuous track structure arranged with successive dips, rises and curves and substantially horizontal sections with the rails of the horizontal sections arranged with undulations, and a notched bar arranged in parallel relation to a dip portion in the track for engagement by a resilient pawl carried by a car propelled along the track to serve as a clapper.

16. In an amusement ride, a track structure arranged with successive dips, rises and curves having sections arranged with undulations, and bell ringing means comprising a series of interconnected levers normally urged to a predetermined position to extend into the path of an abutment on a car and to be successively engaged by said abutment as the car passes along said section of the track, and one of said levers carrying a bell striker arranged in operative relation to a pair of bells.

17. In an amusement ride, a track structure arranged with dips, rises and curves and having sections arranged with undulations, and electric shocking means arranged at a predetermined point along the track.

18. In an amusement ride, a track structure for gravity operated cars, a loading platform arranged adjacent to the track having a railing, an electric shocking device connected to said railing and connected in a normally open electric circuit, and circuit closing means arranged in the platform.

19. In an amusement railway, a supporting structure, a continuous track having an up-track section, a declivous section leading from the up-track section to a curved section around one end of the structure to a second up-track section arranged substantially in parallel relation to the first up-track section, a second declivous section leading therefrom to a third up-track section, and then around the end of the structure to a declivous spiral section comprising more than one convolution to a level section intermediate said latter section and the first up-track section and leading to the first up-track section.

20. An amusement railway as claimed in claim 19, wherein the first up-track section is arranged at one side of the structure and leads from one end of the structure to the opposite end, and the declivous section leading from said up-track section circles about one end of the structure, along the opposite side and circles about the opposite end of the structure to the second up-track section, and said latter up-track section is arranged within and substantially parallel to but in a higher plane than the first up-track section, and the declivous section leading from the second up-track section circling about one end of the structure to the opposite side, and the up-track section leading from said latter declivous section and the declivous spiral section being arranged at the opposite end of the structure.

Signed at city of New York, in the county of New York and State of New York, this 30th day of January, 1925.

HARRY G. TRAVER.